United States Patent
Parasmal et al.

(10) Patent No.: US 10,601,703 B2
(45) Date of Patent: Mar. 24, 2020

(54) DISTRIBUTED QUALITY-OF-SERVICE (QOS) IN AN OVERLAY NETWORK USING CAPACITY ENFORCEMENT

(71) Applicant: Akamai Technologies, Inc., Cambridge, MA (US)

(72) Inventors: Vinodkumar Parasmal, Chennai (IN); Parthasarathy Narayanan, Chennai (IN); Maswood Ahmed Basheer Ahamed, Chennai (IN); Brandon O. Williams, Revere, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 283 days.

(21) Appl. No.: 15/393,299

(22) Filed: Dec. 29, 2016

(65) Prior Publication Data

US 2017/0195217 A1 Jul. 6, 2017

Related U.S. Application Data

(60) Provisional application No. 62/273,047, filed on Dec. 30, 2015.

(51) Int. Cl.

| | |
|---|---|
| *G06F 15/173* | (2006.01) |
| *H04L 12/725* | (2013.01) |
| *H04L 29/08* | (2006.01) |
| *H04L 12/851* | (2013.01) |
| *H04L 29/06* | (2006.01) |
| *H04L 12/46* | (2006.01) |
| *H04L 12/813* | (2013.01) |

(Continued)

(52) U.S. Cl.
CPC ........ *H04L 45/302* (2013.01); *H04L 12/4633* (2013.01); *H04L 47/24* (2013.01); *H04L 65/80* (2013.01); *H04L 67/02* (2013.01); *H04L 67/1002* (2013.01); *H04L 67/289* (2013.01); *H04L 67/322* (2013.01); *H04L 45/64* (2013.01); *H04L 47/20* (2013.01); *H04L 67/2842* (2013.01); *H04W 28/0268* (2013.01)

(58) Field of Classification Search
CPC ..... H04L 65/80; H04L 45/64; H04L 12/4633; H04L 67/02; H04L 41/5003
See application file for complete search history.

(56) References Cited

U.S. PATENT DOCUMENTS

| | | | |
|---|---|---|---|
| 2008/0219268 A1* | 9/2008 | Dennison | H04L 12/4625 370/395.2 |
| 2016/0380909 A1* | 12/2016 | Antony | H04L 47/722 370/236 |
| 2017/0195237 A1* | 7/2017 | Parasmal | H04L 47/2433 |

\* cited by examiner

*Primary Examiner* — Oleg Survillo
(74) *Attorney, Agent, or Firm* — David H. Judson

(57) ABSTRACT

The techniques herein provide for enhanced overlay network-based transport of traffic, such as IPsec traffic, e.g., to and from customer branch office locations, facilitated through the use of the Internet-based overlay routing infrastructure. This disclosure in particular describes a method of managing and enforcing quality-of-service (QoS) in an Internet-based overlay network shared by a set of content provider customer entities. For each entity having a customer branch, the customer branch is coupled to the Internet-based overlay routing network. A quality-of-service (QoS) policy is configured for the customer. According to the method, utilization of the Internet-based overlay network against the configured QoS policy is then monitored. The QoS is then enforced for the customer and at least one other customer, based in part on the QoS policies.

4 Claims, 6 Drawing Sheets

(51) Int. Cl.
*H04W 28/02* (2009.01)
*H04L 12/715* (2013.01)

DISTRIBUTED QUALITY-OF-SERVICE (QOS) IN AN OVERLAY NETWORK USING CAPACITY ENFORCEMENT

BACKGROUND

Technical Field

This application relates generally to overlay network routing over the publicly-routed Internet.

Brief Description of the Related Art Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

A wide area network (WAN) is a telecommunications network e.g., with links across metropolitan, regional, national or international boundaries, that covers a broad geographical area, typically using leased telecommunication lines. Enterprises and government entities utilize WANs to relay data among employees, clients, buyers, and suppliers from various geographical locations. For example, a WAN commonly is used to connect local area networks (LANs) and other types of networks together, so that users and computers in one location can communicate with users and computers in other locations. Many WANs are built for one particular organization and are private. Other types of WANs include those built by Internet service providers, and these can be used to provide connections from an organization's LAN to the Internet. When a WAN is built using leased lines, a router positioned at each end of the leased line connects the LANs on each side to each other.

One common WAN approach using leased lines implements Multi-Protocol Label Switching (MPLS). MPLS is a standard-based technology for speeding up network traffic flow. In MPLS, a specific path (identified by a label) is set up for a given packet sequence, thereby obviating router look-up of a next address to which to forward the packet. MPLS works with various types of network protocols, such as IP, ATM and frame relay. While delivery over MPLS is efficient and secure, it also is expensive, primarily due to the cost of the leased line. As an alternative, WANs also can be built using less costly packet switching methods such as those that can take full advantage of the Internet's packet-switched network.

MPLS providers often must provide support for customers with branch offices that are not within reach of the provider's MPLS cloud. One common solution is for the MPLS provider to place VPN (IPsec) concentrators at the edge of their MPLS cloud. The provider may then provide the customer with a Customer Premises Equipment (CPE) device (e.g., a router) that will connect to a standard broadband Internet connection to connect to their MPLS services via the VPN concentrator. The number and location of the VPN concentrators, however, is often limited, resulting in varying performance depending on a branch office customer's location.

More generally, enterprises now desire to effectively utilize Internet links as an optimized wide area network (WAN), connecting branches, data centers, teleworkers and mobile users to applications over the Internet. Driven also by the impact of cloud computing and mobility, enterprises need a network service that can deliver an optimal and predictable cloud experience to users, preferably a network that is low-cost, easy-on, and global with security and optimization built-in.

BRIEF SUMMARY

The techniques herein provide for enhanced overlay network-based transport of traffic, such as IPsec traffic, e.g., to and from customer branch office locations, facilitated through the use of the Internet-based overlay routing infrastructure. This disclosure in particular describes a method of managing and enforcing quality-of-service (QoS) in an Internet-based overlay network shared by a set of content provider customer entities. For each entity having a customer branch, the customer branch is coupled to the Internet-based overlay routing network. A quality-of-service (QoS) policy is configured for the customer. According to the method, utilization of the Internet-based overlay network against the configured QoS policy is then monitored. The QoS is then enforced for the customer and at least one other customer, based in part on the QoS policies. Capacity preferably is enforced for a customer entity according to the QoS policy at one of: a global level, a geographical region level, and at the customer branch level.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
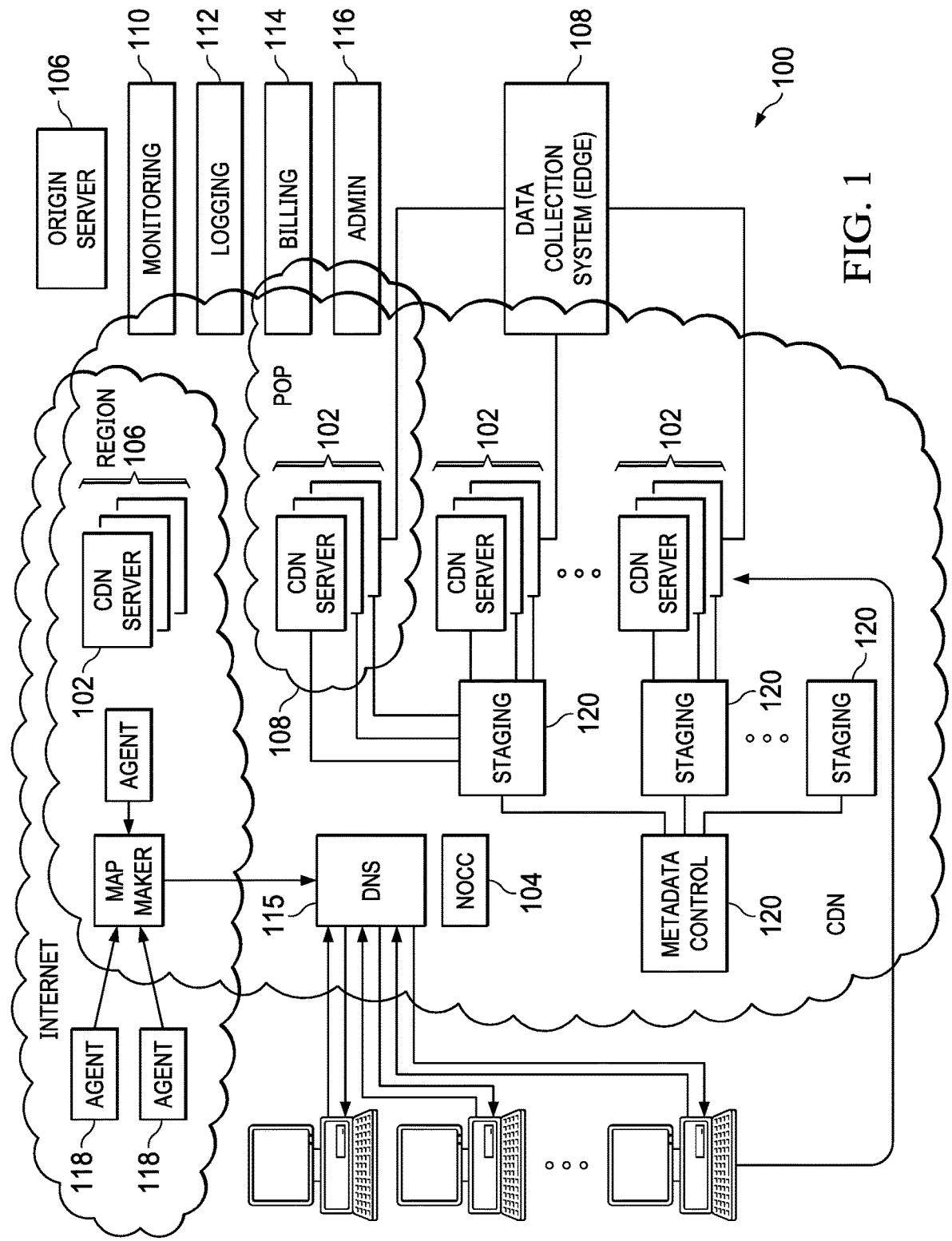
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
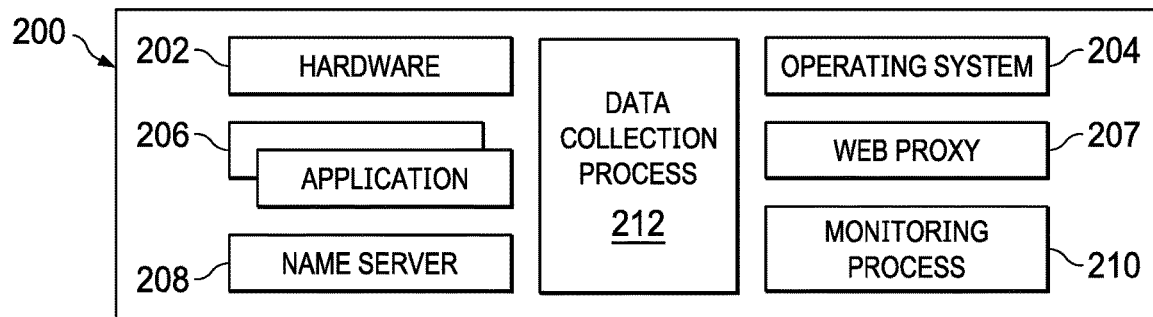
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities). This type of managed solution provides an enterprise with the opportunity to take advantage of CDN technologies with respect to their Company's intranet.

As an overlay, the CDN resources such as described above also may be used to facilitate wide area network (WAN) acceleration services between enterprise data centers (which may be privately-managed) and third party software-as-a-service (SaaS) providers. The following provides additional details regarding this type of solution.

Figure 3:
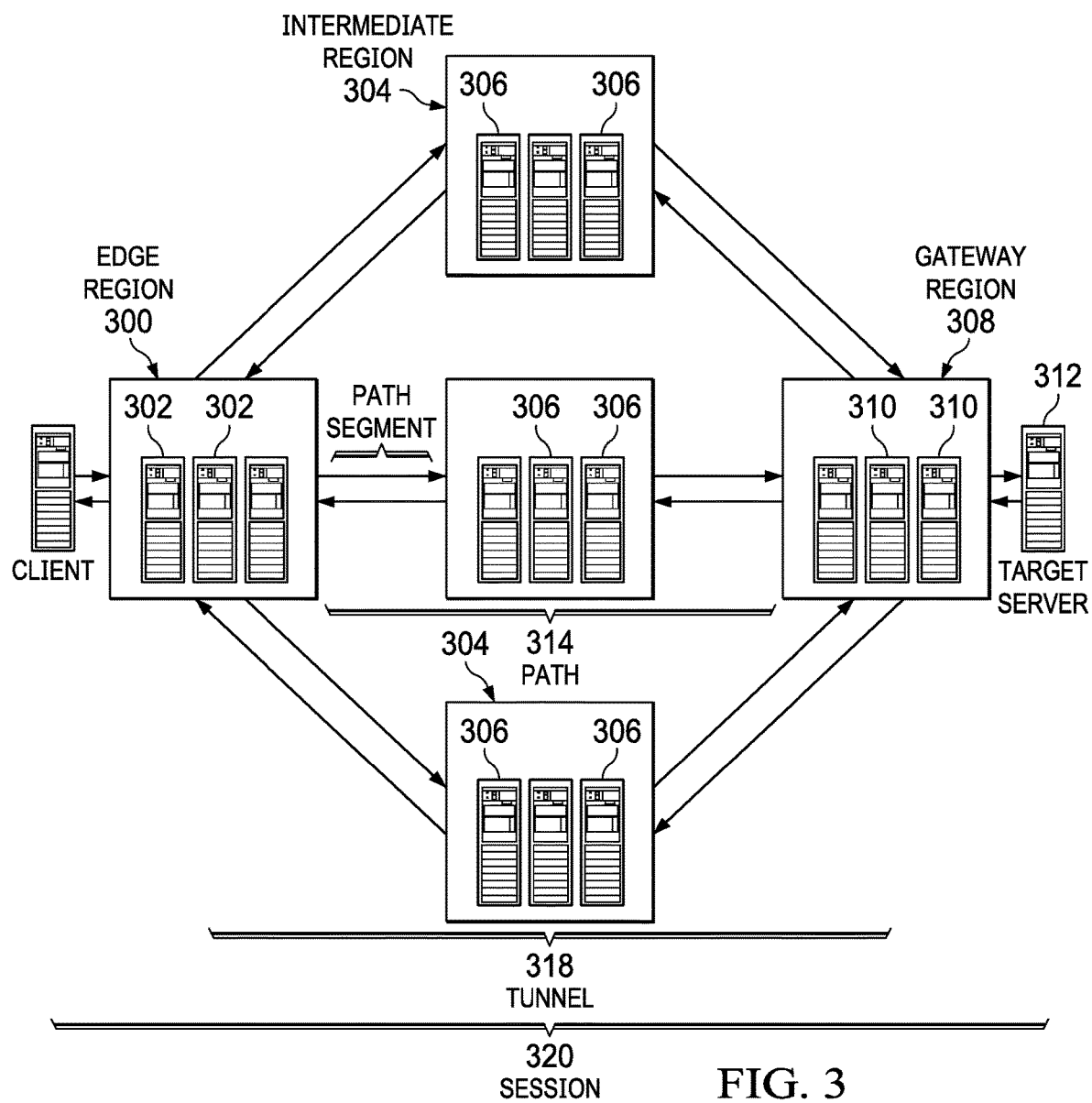
FIG. 3 is a known overlay solution whereby an overlay is positioned on top of the publicly-routable Internet.

In particular, FIG. 3 illustrates a known "overlay" network solution whereby an "overlay" is positioned on top of the publicly-routable Internet. This architecture is sometimes referred to as a "routing overlay" or "routing overlay network." The routing overlay network may leverage existing content delivery network (CDN) infrastructure, such as the infrastructure shown in FIGS. 1-2 above, and as provided by commercial services providers such as Akamai Technologies, Inc. of Cambridge, Massachusetts. An overlay network of this type provides significant performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes the packet's destination, which Internet routers use to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

Many of the machines in the overlay are servers located near the edge of the Internet, i.e., at or adjacent end user access networks. As has been described above, e.g., FIG. 1, third party web sites and application providers offload delivery of content and applications to the network, which operates as a managed service. The overlay network includes distributed infrastructure for data collection, monitoring, logging, alerts, billing, management and other operational and administrative functions. As has been described and as shown in FIG. 2, a typical CDN machine comprises commodity hardware (e.g., an Intel® Pentium® processor) running an operating system kernel (such as Linux™ or variant) that supports one or more applications. To facilitate content delivery services, for example, given machines typically run a set of applications, such as an HTTP Web proxy, a name server, a local monitoring process, and one or more data collection processes. The Web proxy includes or has associated therewith an edge server manager process to facilitate one or more functions associated with the content delivery network.

A known OIP (Overlay Internet Protocol) routing mechanism comprises a representative set of components, as illustrated in FIG. 3:

edge server 302—typically, a CDN edge server running an OIP edge server software process (oidp) as described below. As will be described, this software is responsible for receiving, encapsulating and forwarding IP packets.

edge region 300—typically, a CDN edge region configured for the overlay mechanism.

intermediate server 306—typically, a server that receives encapsulated packets from an edge region 300 or other intermediate servers and forwards them on to other intermediate servers or to a gateway region.

intermediate region 304—a region of intermediate servers.

gateway server 310—typically, an edge server that has been configured to receive encapsulated packets from the overlay, and that applies source network address translation (NAT) to the original packets and forwards them onto the target server.

gateway region 308—typically, a type of edge region comprising gateway servers and that is usually deployed on customer premises.

Target server 312—a machine whose traffic is to be tunneled through the overlay.

target address—the IP address of the target server; this address is sometimes referred to as a direct address when being compared to a CDN virtual IP address.

slot—a single "instance" of the overlay; preferably, a slot is a numbered index that corresponds to a single target address.

virtual IP address—typically, a CDN address that corresponds to a slot; preferably, there is one virtual IP address per edge region per slot. It is sometimes referred to as a VIP.

path 314—an ordered set of CDN regions between an edge region and a gateway region.

path Segment 316—a single hop of a path.

tunnel 318—a set of one or more paths from an edge server to a gateway server.

session 320—A single end-to-end connection from the client 322 to the target server; preferably, the session is defined by a five tuple (IP payload protocol, source address, destination address, source port, destination port). The source is the client and the destination is the target.

Figure 4:
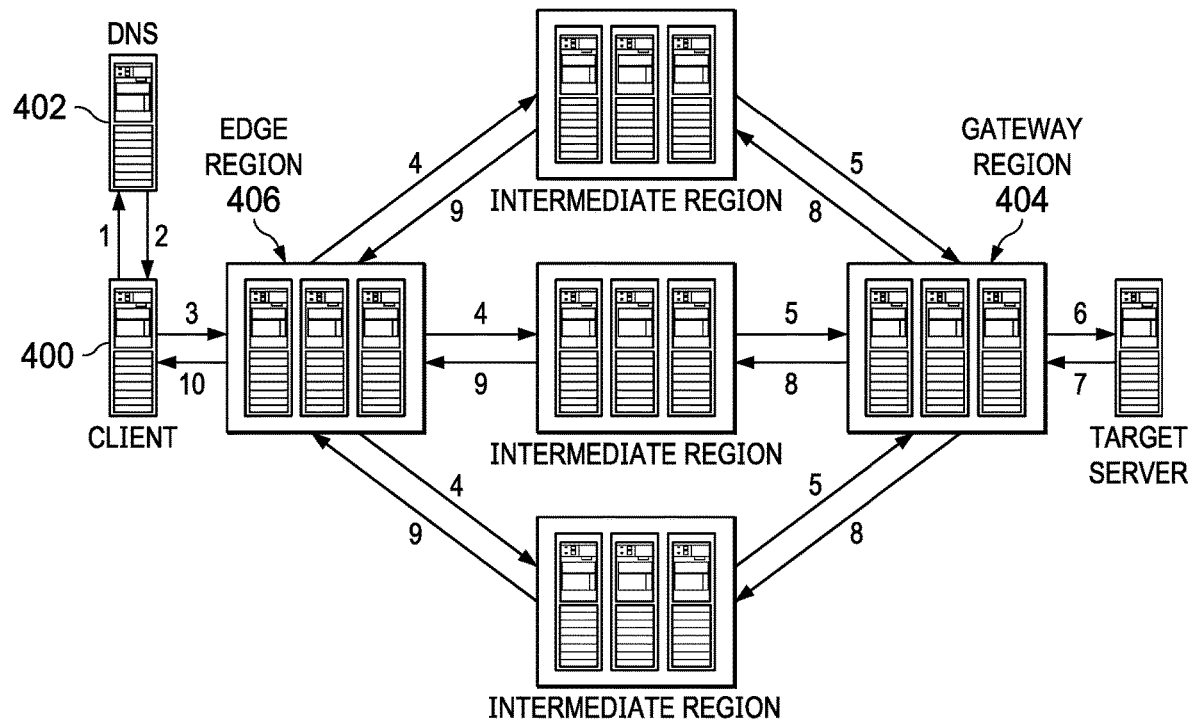
FIG. 4 illustrates a multi-path overlay IP (OIP) routing mechanism implemented within a content delivery network, such as shown in FIG. 1.

In one known use scenario of the overlay network, one or more clients desire to send packets to a single IP address. This is illustrated in FIG. 4 and is now described. At step 1, the client 400 makes a DNS request to resolve a hostname, typically a hostname associated with a web-accessible application. This hostname is aliased (e.g., by a CNAME) to a domain that is being managed by an authoritative DNS 402; typically, the authoritative DNS is managed by the CDN service provider. Preferably, this hostname corresponds to a single gateway region (and target address) 404. This is also referred to as a slot, as described above. At step 2, the DNS query returns a single IP address for the hostname. This address identifies a best performing available edge region 406 and, preferably, that region is dedicated to the hostname. The address is referred to as a virtual IP address, as described above. At step 3, the client 400 begins to send IP packets to the virtual IP address. These packets are received by a server in the edge region 406. The edge region 406 knows the gateway region 404 to which to send the packets based on the destination address in the IP packet header. The packet is then encapsulated. At step 4, and based on routes preferably provided by a CDN mapping system, the edge server in the edge region 406 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 404, once again, preferably based on routes provided from the CDN mapping system. At step 6, the packets are received by a server in the gateway region 404, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 406 from which the client packet originated. At step 7, the gateway region 404 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the edge region.

The various connections used in the overlay network and as described typically are secured via SSL or other transport layer security (TLS) techniques.

A virtual private network (VPN)-as-a-service (or more generally, "network-as-a-service") can be facilitated using an overlay IP (OIP) routing mechanism such as shown in FIG. 3. The notion of networking "as a service" enables enterprises to effectively utilize Internet links as an optimized wide area network (WAN), connecting branches, data centers, teleworkers and mobile users to applications over the Internet. Driven by the impact of cloud computing and mobility, enterprises need a network service that can deliver an optimal and predictable cloud experience to users, preferably a network that is low-cost, easy-on, and global with security and optimization built-in.

Figure 5:
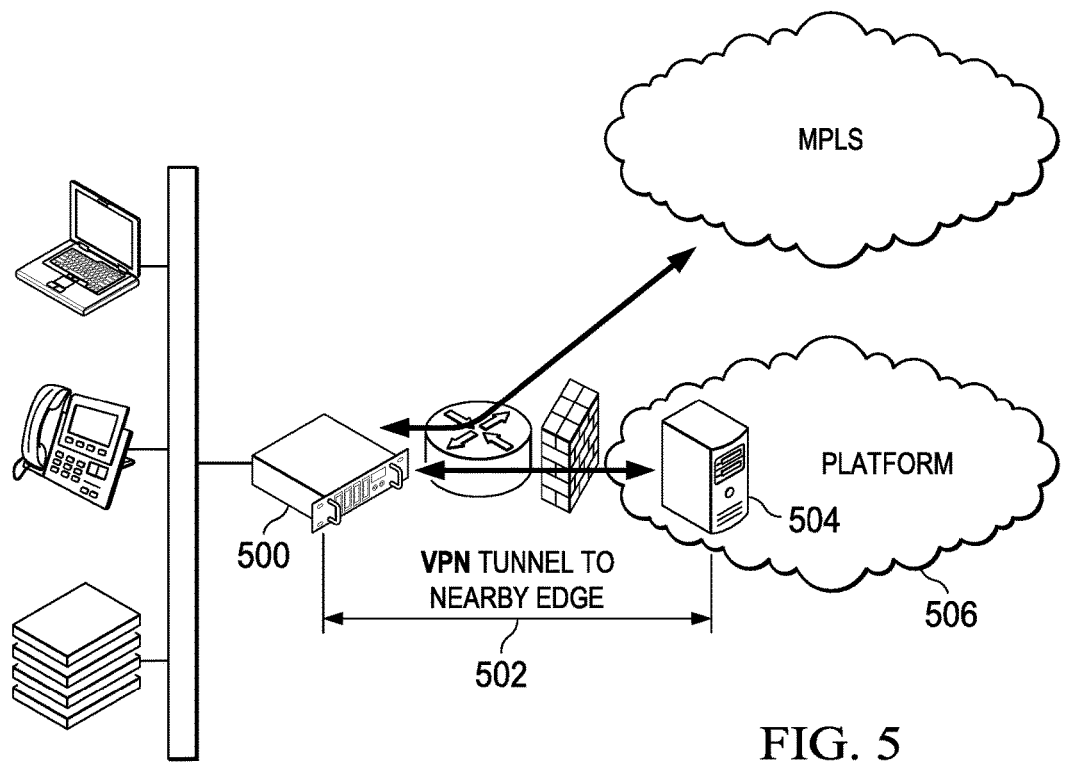
FIG. 5 illustrates a typical use case scenario for an enterprise that has a corporate data center to which are connected one or more branch locations, typically over wide area network Multi-Protocol Label Switching (MPLS)

FIG. 5 illustrates how an overlay network appliance 500 at one endpoint establishes a secure logical VPN tunnel 502 to a nearby edge region or regions 504 of the overlay network 506. In this context, the network appliance 500 typically provides IPSec-based authentication and flow-based encryption, and the secure logical VPN tunnel 502 may incorporate one or more encrypted flows. Preferably, the edge 504 uses communications (e.g. keep-alive signaling) to maintain the tunnel through the enterprise firewall 508. When the overlay network customer desires to connect its local (inside the firewall) network, it can use the Internet-based overlay by having the appliances positioned at or adjacent to each endpoint when the local network connects to the Internet.

A description of this network-as-a-service approach is provided in U.S. Publication No. 2015/0188943.

With the above as background, the techniques herein provide for enhanced overlay network-based transport of traffic, such as IPsec traffic, e.g., to and from customer branch office locations, facilitated through the use of the Internet-based overlay routing infrastructure (OIN) described above.

As used herein, the following definitions apply:
Allocated Capacity
  Capacity share (bps) which is calculated dynamically for entities contending for customer purchased capacity. This is calculated based on traffic load information from region machines.
Capacity Groups
  Arbitrary groups/grouping for capacity entitlement
Configured Capacity
  Capacity limit (bps) for a CPE configured from a service provider cloud-based management portal. This is also referred as "enforcementThreshold." This is defined as a threshold over purchased capacity.
Control Messages
  Messages which carry traffic load report and allocated capacity information
CCI
  Common Communication Infrastructure (a message delivery infrastructure)
CPE
  Customer Premise Equipment. See also endpoint. These terms refer to the same entity CoGS
  Cost of Goods Sold
Cycle Time
  Time interval after which load is reported and capacity allocation is performed
Demand
  Rate of traffic in bps received from/to CPE or set of CPEs. This is tracked separately based on direction of data transfer. Traffic received on edge from CPE is referred as "Inbound Demand" and traffic received on gateway destined to a CPE is referred as "Outbound Demand."
DQoS
  Distributed Quality of Service
enforcementThreshold
  Threshold configured as a percentage of "purchased capacity." This is configurable for each CPE, and is used as a limit to enforce traffic rate from/to the corresponding CPE
Edge
  Overlay network edge region according.
Endpoint
  CPE device connecting into Edge. This is identified either based on configuration or fields carried on the packets
First Mile
  Network segment(s) from Edge to customer Origin
Global Update Timeout
  Cycle time (in seconds) for traffic load reporting to centralized QoS component.
GQM
  Global QoS Manager
Inbound
  This is with respect to a particular endpoint and edge and refers to traffic coming from endpoints into an Edge region
Last Mile
  Network segment(s) from Edge to Client (Branch)
monitoringThreshold
  Threshold configured as a percentage of "purchased capacity." This is configurable for each CPE, and is used to raise notifications about overutilization
Middle Mile
  Network segment(s) from Edge to overlay network Edge/Gateway
NEdge
  OIN edge region that implements the disclosed subject matter. As used herein, the NEdge includes a set of enterprise-focused functionality to facilitate DQoS, to enable termination first-mile IPsec tunnels, to provide specialized mapping for TCP connections, to enable SSL terminations, to provide for support of a secure web gateway (SWG), and to enable application layer optimizations.
NEdge SLA Time
  Time window for reporting SLA metrics
Outbound
  This is with respect to a particular CPE and NEdge and is referred to traffic delivered to CPE from Edge
Packet Queues
  Queues used in QoS Engine to hold packets. A packet queue is associated for each endpoint.
Partner
  Service providers or other vendors of service who purchase NEdge services on behalf of their customers
Purchased Capacity
  Capacity entitlement per CPE purchased by service providers or direct customers
QoS
  Quality of Service
QoS Engine
  Quality of Service Datapath Engine
Region Update Timeout Cycle time (seconds) for traffic load reporting and aggregation in a region.
RQM
   Region QoS Manager
SLA
   Service Level Agreement
SMN
   Software Managed Network
SP
   Service Provider
Traffic Attributes Digest
   Reported demand and bandwidth utilization for previous interval. This is also referred as Load report
Underutilization
   Used to represent conditions when usage is restricted to below a given capacity due to certain reasons.
Utilization
   Bandwidth utilization Distributed Quality-of-Service Mechanism As noted above, NEdge and related systems provide for a range of traffic optimization capabilities, including QoS, route optimization, TCP optimization, object caching at the edge, among others.

This first section covers an automatic capacity enforcement use case, and it provides the design for a Distributed QoS.

In this approach, preferably the NEdge is a modified type of overlay network edge region (namely, a modified version of edge region 300 in FIG. 3), which is used as the entry point for delivery of traffic (typically IPsec tunnel traffic) using the OIP network's existing routing and loss-mitigation capabilities to provide improved reliability when compared to the standard Internet. Typically, and as has been described, typically the end-to-end IPsec traffic is delivered to the NEdge from the customer site using an authenticated outer IPsec tunnel originating from a router.

Distributed QoS
   The infrastructure herein provides for distributed mechanisms that support policies pertaining to capacity enforcement. QoS policies for application level prioritization, bandwidth, latency, jitter and packet loss control may also be implemented using the same basic design.

Capacity Usage Monitoring and Enforcement
   Usage monitoring herein typically involves setting monitoring thresholds and providing views to customer support about overutilization. Customer support might use this view to notify customers about utilization patterns and the need to obtain additional capacity. In the event customers or CPEs are found to be repeated abusers, enforcement may be turned on for those CPEs. In one embodiment, enforcement would accommodate bursting over some given (e.g., purchased) capacity. The limit to which each CPE can burst may be configurable. More generally, the supported policies preferably facilitate enforcement of capacity at the level of a partner, customer of a partner, a customer-specific geographical region, and at an individual branch-office/endpoint.

Benefits Due to Capacity Enforcement
   Capacity enforcement for upload or download traffic flows from CPE is applied at or below legs of the data flow to conserve NEdge Region(s) capacity, namely CPE upload traffic which is egressing from edge region (resulting in bandwidth savings on multiple network segments such as edge-to-gateway, or edge-to-origin and gateway-to-origin), CPE download traffic which is egressing from gateway region (resulting in bandwidth savings on multiple network segments such as gateway-to-edge and edge-to-CPE), and CPE download traffic which is egressing from edge region (resulting in edge-to-CPE bandwidth savings).

Capacity Enforcement
   Below are the general objectives for capacity enforcement that are provided by the described technique as described herein:
   (1) Enforce traffic rate from and to a CPE to purchased capacity
   (2) Enforce traffic rate from and to a group of CPEs to group capacity
   (3) Customers should be able to fully utilize the purchased capacity
   (4) Traffic should be enforced to the configured limit with acceptable deviation under certain cases
   (5) Acceptable deviation in the range of +−X % for Y secs duration
   (6) Fair or weighted allocation of capacity to CPEs in the absence of CPE capacity configuration
   (7) Enforcement applied on combination of source and/or destination CPE capacity configuration Network traffic preferably is subjected to capacity enforcement at edge/gateway regions. Wherever traffic flow information about the destination is available, early enforcement for outbound traffic preferably is done. This facilitates an optimized use of capacity assigned to NEdge regions.

Configurability
   QoS policies preferably are configurable for each CPE from the overlay network provider's cloud management portal. Using the portal, it is possible to modify QoS policies any time, and changes should take effect on the next configuration update from portal to the NEdge network. For application QoS policies, preferably the configuration is applied relatively instantaneously. For capacity monitoring and enforcement, configuration of different thresholds over purchased capacity preferably is supported.

Monitoring
   The service provides useful information to track usage and availability. Below are the monitoring features: availability of usage and enforcement statistics on query and logs, support portal reports and alerts for usage and availability monitoring, ability to monitor capacity usage without enabling enforcement, ability to track demand (Rx) and usage (Tx) in bps, report dropped packets and bytes count, availability of partner, customer, group and endpoint level usage information, availability of real time data updated periodically, and availability of historical data for last xx days, updated periodically (hours, minutes).

Figure 6:
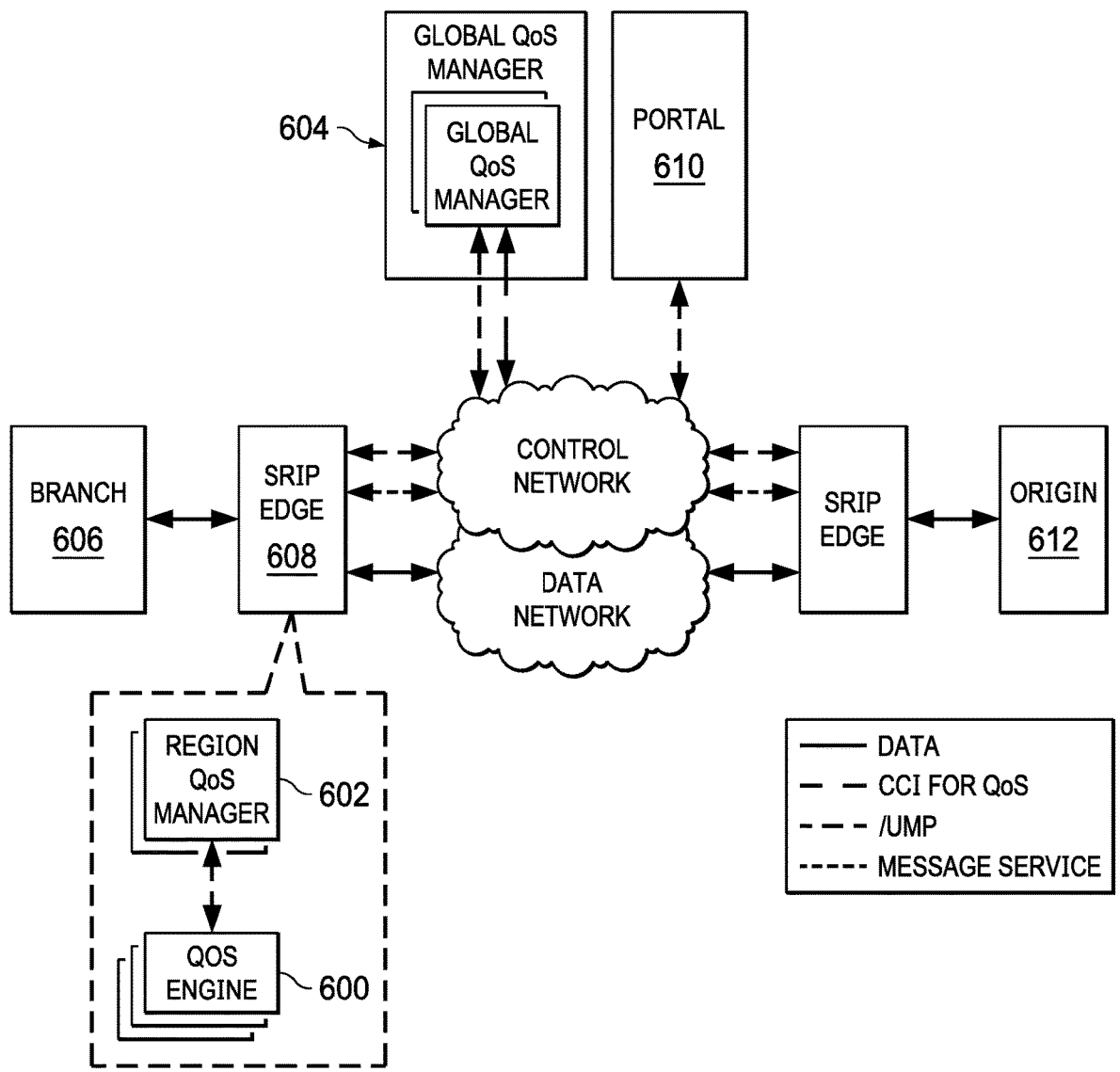
FIG. 6 depicts an architecture of a distributed quality-of-service (QoS) mechanism of this disclosure.

DQoS Mechanism Architecture
   This section provides a brief overview of the preferred QoS components running on edge and GQM machines.
   FIG. 6 depicts the Distributed QoS components and their interfaces with other components and platform services. These components are the: a QoS Engine (QE) 600, a QoS Manager (QM), a Region QoS Manager (RQM) 602 running on NEdge, and interfaces between them. Preferably, QoS Engine is multi-tenant capable, and it runs a fair packet scheduler to ensure fair service across customers.
   QoS Engine 600 applies policies to data traffic based on policy configuration. The engine runs on edge machines, e.g., as a static linked library. Policy configuration and packets are passed to the QoS Engine by invoking appropriate APIs defined in QoS.
   QoS Manager's primary function is to collect traffic attributes from QoS Engine and send the digest to Region Leader (RQM), e.g., using in-region messaging infrastructure. On receiving a dynamic capacity message from RQM, QoS Manager updates the customer capacity and informs QoS Engine to apply the updated policy for customer traffic.

Each NEdge region has an elected leader for the QoS function called the Region QoS Manager (RQM). The RQM collects traffic load report from region machines and sends aggregate customer traffic report to central entity (GQM). On receiving allocated customer capacity for region from GQM, RQM calculates per machine allocated capacity and communicates to region machines which had reported demand. NEdge region machines run leader election to elect RQM. RQM health is monitored by tracking leader election health and other parameters maintained in QoS. On RQM failure, a new RQM is elected within couple of seconds from detection time to reduce impact of stale information on customer traffic.

Global QoS Manager (GQM) 604 is the central entity that aggregates traffic attributes from edge regions and calculates per customer capacity allocation for each region. GQM runs the capacity allocation algorithm (referred to herein as Capacity Allocation to regions), and arrives at the capacity allocation for regions which have reported demand. GQM batches capacity allocation for different customers preferably in a single message while sending the capacity update to RQMs. It propagates the "allocated capacity" using control messages to Region Leaders (RQM). To avoid single point of failures in the GQM function, multiple GQM regions preferably are provisioned in different geographies. In one embodiment, GQM is deployed in stand-alone dedicated regions. GQM preferably runs in active-active failover mode, wherein only the GQM leader responds to RQMs. GQM non-leaders receive and process the traffic attributes digest from regions, but need not propagate the capacity updates back to regions. GQMs participate in leader election to elect the GQM leader. On failure events or reachability issues related to the GQM leader, one of the other GQMs gets elected as the leader and starts responding to RQMs with capacity updates.

End-to-end traffic flow is from the customer branch 606 to the origin 612, via the overlay as described above. The overlay edge includes the NEdge 608. A portal 610 is used for configuration.

Figure 7:
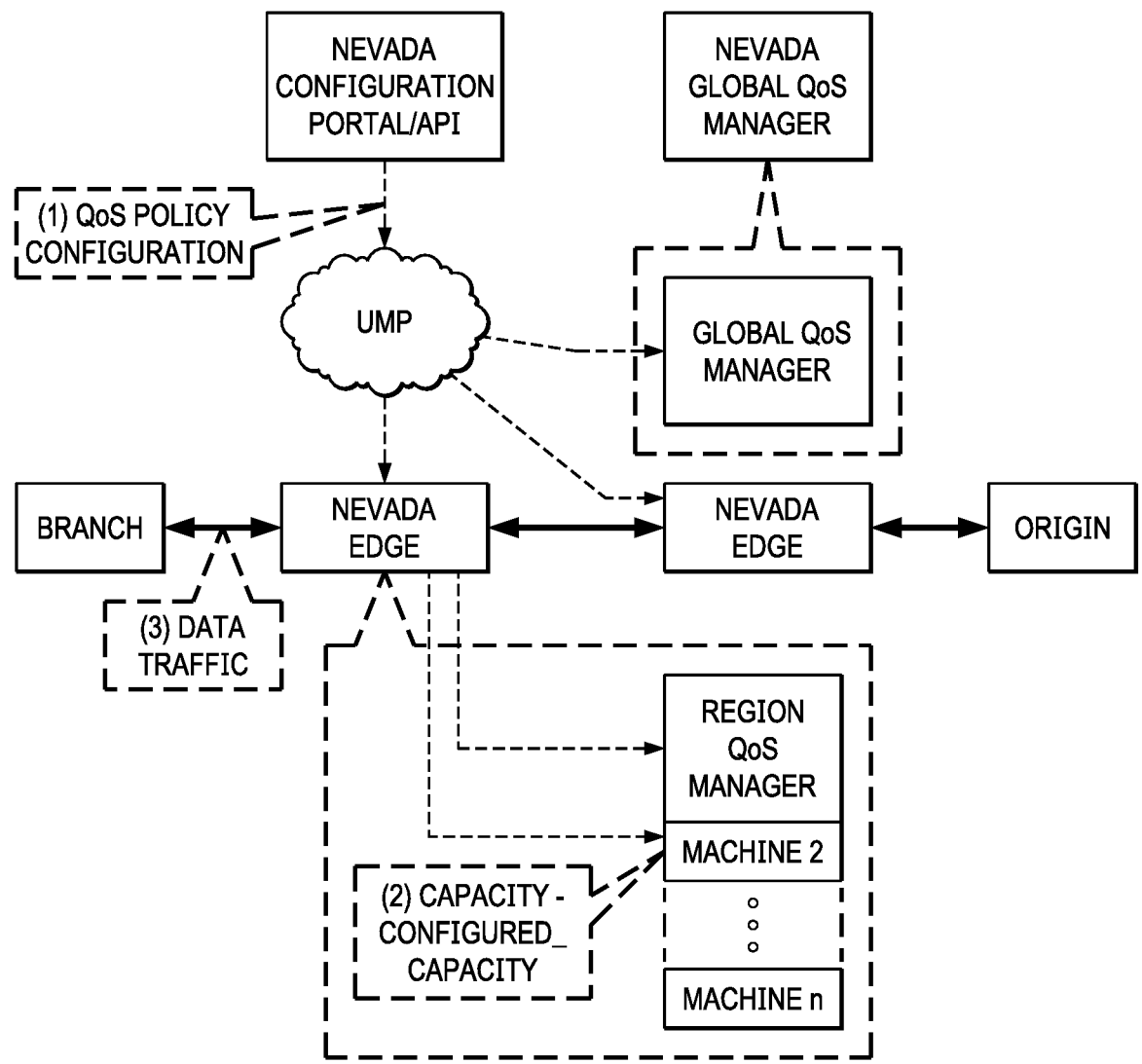
FIG. 7 depicts a configuration operation for the distributed QoS mechanism.
Figure 8:
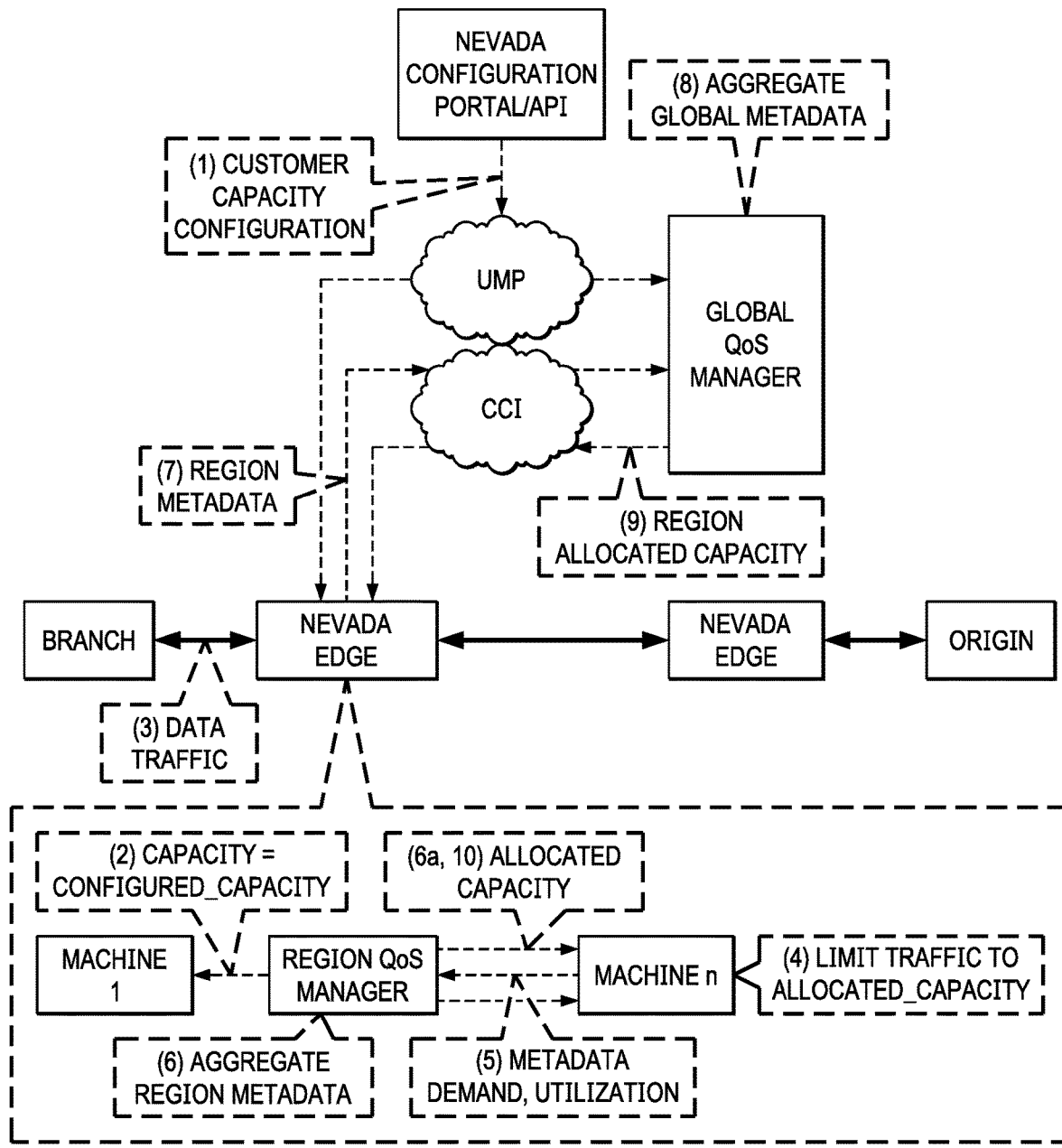
FIG. 8 depicts end-to-end flow for capacity enforcement according to an embodiment of this disclosure.

FIG. 7 depicts a configuration process, which is initiated via the portal. On configuring QoS Policies from the portal, the following actions preferably are performed as illustrated. In particular, QoS configuration is sent along with other configuration over a messaging subsystem to all NEdge and GQM regions. If there are errors in the configuration, the same are reported back to Portal. On receiving QoS configuration, each machine updates local policy context. Depending on machine role, the new policy is applied at appropriate time.

QoS APIs preferably are invoked for following configuration workflows: customer/CPE creation with capacity configuration, enable or disable enforcement for a customer/CPE, modification of customer policy (capacity), and deletion of a customer/CPE.

QoS policy configuration typically includes the following information: Identifier, Policy Type, and Policy parameters.

Traffic load information is required for usage monitoring and demand estimation. Preferably, load information for each CPE is reported in terms of bits per second (bps).

On traffic reception, the QoS engine on each machine updates the traffic statistics for each CPE. Preferably, the load information {customerId, demand, utilization, timestamp} is reported to RQM every region_update_timeout seconds. The demand value is useful in enforcement mode.

The region leader aggregates CPE load information received from machines and reports region load to the GQM. Preferably, this is done every "global_update_timeout" seconds.

The load reports received on RQM or GQM are aggregated per CPE or on group basis. Aggregation involves linking all the load reports of a CPE from each of the demanding entities. The aggregated information preferably is processed every cycle-time. Cycle-times are configurable via static configuration. On GQM default cycle time is set to "global_update_timeout". On RQM cycle time is referred to as "region_update_timeout".

Machines report the load data any time after the expiry of the cycle time and preferably there is no explicit cycle start time synchronization across machines in regions, RQMs and GQM. This is done to spread the messaging load over time and to avoid producing a single burst which could stress the messaging infrastructure.

The aggregated load information for a CPE is compared against monitoring thresholds for the CPE and alert information is updated. Alert information is updated based on different configurable thresholds. Aggregate load information and alert information are populated in query tables to be used by reporting and alerting systems. Portal systems pull information from query tables for generating the usage reports.

Capacity Enforcement Algorithm

Preferably, capacity enforcement is achieved by running distributed QoS algorithms as will be described. The base premise for capacity enforcement is given by the following relationship:

Current Action{Police, Learn Demand} ↔ {Aggregate Demand, Calculate New Capacity}

In this approach, current capacity information is used to enforce traffic. While enforcing, demand is learned and propagated. Preferably, demand is aggregated and used for capacity allocation for a next time interval, and demand is learned on each machine and then aggregated at a region level, as well as globally. Preferably, global demand is then used to calculate capacity for each of the regions (for the next time interval). The calculated capacity is propagated back to each region and the machines the region. New capacity information is used for further enforcement. Preferably, the above-described operations are carried out for each time interval.

Preferably, the following algorithms are run in the respective components identified to provide global quality of service:

A rate limiting algorithm is executed in the QoS engine on the region machines. Its inputs are: customer capacity configuration, customer traffic, and data transfer direction, and its outputs: (a) contribute to global geo-wise capacity enforcement (by local rate limiting), and (b) comprise metadata for deciding capacity allocation.

A fairness across customer(s) algorithm is executed in the QoS engine on the region machines. Its inputs are: customer capacity and customer traffic, and its output ensures that traffic from different customers is served in a fair manner inside the QoS engine, and that CPU and memory resources budgeted for QoS are allocated fairly to customer traffic.

A machine capacity allocation algorithm executes in the region QoS manager. Its inputs are: metadata from region machines, and region capacity from GQM (described in more detail below). Its outputs are: (a) aggregate customer demand in region, (b) aggregate customer utilization in region, and (c) individual machine customer capacity.

A region capacity allocation algorithm executes in the global QoS manager. Its inputs are: customer capacity configuration, and metadata from RQM (described in more detail below), and its output is a region customer capacity allocation.

A capacity allocation to region machines algorithm (RQM) is now described. As noted above, the machine capacity algorithm takes the following inputs: (a) metadata, (b) region allocated capacity, (c) allocation trigger, and (d) allocation technique. The metadata is received from region machines, preferably on expiry of "region update timeout. RQM aggregates metadata and maintains the same for every update interval. Regarding (b), RQM updates region allocation capacity as follows: initially, region allocated capacity equals customer global capacity; on receiving allocation from GQM, region allocation capacity is then set equal to GQM allocated capacity. RQM uses the most recent "region allocation capacity" while calculating per machine allocation. Regarding (c), RQM performs allocation on the following events, whichever happens earlier: RQM has received metadata from all the machine serving a particular customer, or region capacity allocation timeout has occurred. Regarding (d), RQM preferably uses a max-min fairness algorithm while allocating machine capacity from region allocation capacity. That algorithm formally defines max-min fair allocation as follows: resources are allocated in order of increasing demand, no source gets a resource share larger than its demand, and sources with unsatisfied demands get an equal share of the resource. This technique maximizes the minimum share of a source whose demand is not fully satisfied. Based on the above algorithm, capacity allocation to machines is based on the following factors: region allocated capacity, number of machines which have reported demand for a particular customer, and demand from each machine.

A capacity allocation to regions algorithm (GQM) is now described. As noted above, GQM takes the following inputs: (a) metadata, (b) configured capacity, (c) allocation trigger, and (d) allocation technique. The metadata is received from region leaders, preferably on expiry of "global update timeout. GQM aggregates metadata and maintains the same for every update interval. Regarding (b), GQM receives customer capacity configuration from a customer portal. Regarding (c), GQM performs allocation on the following events, whichever happens earlier: GQM has received metadata from all regions serving a particular customer, or global capacity allocation timeout has occurred. Regarding (d), GQM preferably uses a max-min fairness algorithm while allocating region capacity from configured capacity. Based on the above algorithm, capacity allocation to regions is based on the following factors: global customer capacity configuration, geo-specific capacity configuration (if configured for the customer), number of regions which have reported demand for a particular customer, and demand from each region.

Capacity is enforced for each customer globally by each NEdge machine performing local rate limit of customer traffic to allocated capacity. To start with, each NEdge region and machine preferably use an allocated capacity value that is the same as the configured capacity. Going forward, and based on policy metadata exchanges, allocated capacity is received and used for rate limiting on region machines.

Once the NEdge machine receives allocated customer capacity, it updates the customer configuration and applies a rate limiting algorithm (e.g., token bucket), which also controls burstiness. Traffic beyond a specified or configured rate is dropped.

Fairness across customers may be enforced by a packet queue scheduler that runs through all backlogged ingress queues in a weighted round robin manner. Once it selects a queue from which to de-queue packets, it de-queues head packet and applies corresponding policy on that packet. Preferably, the weight for a customer is derived from configured capacity.

Additional Details and Embodiments

The following sections describe GQM functions that are executed when enforcement is turned on; preferably, GQM's role in capacity enforcement is active only when the competing entities are spread over different edge or gateway regions.

Demand tracking and estimation is done by GQM for CPEs for which enforcement is on. The aggregated demand information for a CPE is tracked by GQM for a number of previous cycle times and is used for demand estimation for next interval. The estimated demand serves as input for capacity allocation.

The following are representative characteristics of load reporting from regions
 1. Traffic load report for a customer/CPE can be received from different regions
 2. Edge regions can start reporting traffic load anytime
 3. Edge regions can stop reporting traffic load anytime
 4. Traffic load report messages may get lost or delayed in transit Demand estimation needs to take care of the above input characteristics and output a reasonably stable estimate. Below is the summary of proposed demand tracking and estimation:
  The demand value represents the actual rate of traffic as received from a CPE or rate of traffic from origin to CPE
  Demand values from previous intervals are used for demand estimation for next (current) interval.
  If demand values for current cycle are received before aggregation kicks in, the same is accounted as well for demand estimation. Irrespective of whether load information for a CPE is received for current cycle from a demanding entity, demand estimation is done based on average value of a last set of load information.
  Weights can be used for more recent information compared to older values.
  Abnormal demand values are capped to capacity limit
  The estimated demand values are fed to the next stage for arriving at capacity share for each of the demanding entities. Capacity allocation involves dividing the purchased capacity to the competing entities. Depending on how customers purchase capacity and how the capacity needs to be shared, the competing entities are identified as follows:
   a. Group Capacity
    i. regions
    ii. individual CPEs
   b. CPE download capacity
    i. gateway regions or
    ii. individual source of traffic (origin)
    iii. individual flow based on classification information Capacity share is calculated for each competing entity. Configured capacity value and estimated demand from each competing entity are used to determine the share of the customer capacity for that entity. The following describes the allocation scheme for group and CPE capacity enforcement.

When traffic flow is initiated, all CPEs which are part of the group are allowed to burst till the configured capacity.

After the traffic load report is sent to GQM and capacity updates received from GQM, the entities are limited to capacity provided by GQM. Hence the aggregate traffic is enforced to the group capacity.

Capacity allocation for a capacity group is done from GQM based on one of the below approaches:
- Calculation of capacity for each edge region serving customer traffic for the specified group
  - This is done when identification info about the CPE is not known
- Calculation of capacity share for each CPE in a capacity group
  - CPE identification information is required for each CPE which is part of the group
  - Fair allocation for CPEs competing for group capacity
  - CPEs in a group can get mapped to same region
  - CPEs in a group can get mapped to different regions
- CPE capacity enforcement is achieved as follows:
- Upload or inbound traffic from a CPE
  - Traffic is enforced on the edge region where the CPE is mapped
  - Rate of traffic egressing from edge region to midgress is controlled
  - Configured capacity value is used to limit the rate
  - It is assumed that only a single region would receive inbound traffic (CPE to Origin) at a given time from a particular CPE. An exception is the case when in-flight traffic is handled in the region where a CPE was previously mapped and the CPE tunnel is moved to a different region (due to load balancing on the edge).
  - GQM intervention is not required for inbound traffic enforcement
- Download or outbound traffic destined to a CPE
  - Origin→Edge→CPE or Origin→Gateway→Edge→CPE
  - Traffic rate is enforced based on GQM capacity allocation
  - Allocation of CPE capacity to sources contributing to outbound traffic. Allocation can be done at one of the below levels based on configuration
    - Gateway regions
    - Each Source or origin Both for Group and CPE outbound capacity enforcement there is a need to allocate the capacity fairly or proportionally or based on priorities to the competing entities. Below section provides details of proposed fair allocation and idle capacity management algorithm followed by an illustration of how the allocation works for a sample configuration and load report.

Based on the objectives of fair allocation, idle capacity management and to reduce deviations from the enforcement limit, a combination of techniques preferably is used for arriving at the capacity share which needs to be communicated to the RQMs. Below is summary of the allocation strategy,
- All entities demanding less than fair share are made aware of their fair share. This is done in anticipation to give all entities a chance to ramp up till the fair share. This would lead to momentary over-utilization (in case all the entities start using their fair share), but this would get settled down on next update from GQM.
- All entities demanding more than or equal to fair share are distributed the unused capacity fairly among them.

Once capacity allocation stage is completed, the allocated capacity values needs to be sent to the RQMs. Considering the messaging overheads and infrastructure limitations, preferably the capacity updates for different CPEs are sent to a RQM in a single message. It might be desirable to communicate the fair share capacity of a CPE or Capacity group to all the regions. This is useful in cases when traffic from/to a CPE gets mapped to a new region, in which case the fair share capacity value available on RQM can be used to control the rate of CPE traffic served through that region. A messaging optimization would be to send the fair share capacity updates to a subset of regions (cached on GQM, mechanism needs to be defined) instead of sending to all the regions in the network.

The previous few sections dealt with the GQM operations. This section covers details about the RQM operations. RQM preferably performs the following:
a. Region level load report aggregation
b. Capacity allocation to region machines
  i. When GQM capacity updates have not been received
  ii. Processing of GQM capacity updates, allocate machine capacity from GQM allocated capacity
  iii. Communication of capacity allocation information to region machines RQM to region machines update cycle times are much lower than GQM to RQM cycle times. RQM would receive load information for a CPE from region machines every region_update_timeout and it keeps aggregating the load information for the duration of global_update_timeout, after which the load report for that CPE is sent to GQM. In the meantime, RQM uses the load information to make any adjustments to capacity allocation to region machines. RQM would intervene into capacity allocation for cases when group control for traffic from or to CPE is required to be done and GQM updates have not been received yet. RQM gets involved in capacity allocation in the following cases:
a. Data flow just started and GQM capacity information has not been received yet. In this case RQM would use CPE capacity or group capacity configuration and load report from region machine to perform allocation of the capacity to the region machines. Allocation strategy as used by GQM to assign capacities to regions is also used by RQM to assign capacities to region machines.
b. Data flow conditions changed and the previous GQM allocation does not hold good for the new traffic characteristics and this change happened before the global update cycle time. In this case RQM can use fair share information from GQM to deduce the new fair share allocation and assign it to machines.

FIG. 7 illustrates the end-to-end flow for capacity enforcement, with the following operations:
1. Configuration of customer capacity policies
2. Propagate configuration to all NEdge regions and to GQM
   a. Machines serving traffic receive the configuration and update QoS Engine about the customer policy.
3. Data traffic received on NEdge machines
4. QoS Engine running on NEdge machines applies the capacity enforcement policy on customer traffic. Uses allocated capacity value to control rate of egress traffic from the machine. Uses configured capacity in absence of allocated capacity.
5. QoS Engine collects traffic load information {demand, utilization} "region timeout" interval for each customer and sends the load report to RQM
6. RQM aggregates traffic load attributes from region machines for a particular customer.
   a. RQM runs allocation algorithm and calculates customer capacity for each machine and sends the same in control message to each of the machines.

7. On "Global Update Timeout", RQM sends aggregated region traffic load to GQM
8. GQM aggregates region traffic load from all regions serving a particular customer
   a. GQM runs allocation algorithm and allocates customer capacity to each region or CPE
9. GQM sends allocated capacity to all the regions serving particular customer
10. On reception of allocated capacity (capacity update message) from GQM, RQM uses allocated capacity for further allocation to region machines (this is sent in next "Region Update Timeout" interval.

Steps (1)-(10) are repeated in case new configuration is done, otherwise (3) to (10) are repeated.

The following section covers details about data flow and QoS packet processing performed on edge/gateway machines. Few assumptions made about data flow are:

All packets from, to a CPE received on a region machine are sent to QoS engine

QoS engine is provided appropriate packet lengths for calculating rate of traffic.

Overhead inclusion for packet length calculation is configurable

An upload data transfer from CPE to origin or to remote CPE through the NEdge machine is classified as inbound traffic at the edge. A download data transfer from origin or remote branch to locally connected branch is classified as outbound traffic at the edge. On the gateway region, where traffic is destined for remote connected CPE (connected to another edge region), traffic is identified as outbound for remote CPE.

Enforcement is applied separately for each direction of data transfer for a CPE. Capacity enforcement for inbound traffic from a CPE is always applied on the edge to which it is mapped and has an established tunnel. Based on the location of traffic source, enforcement for download traffic to a CPE can be applied at different places. It is straightforward when traffic source (origin) is mapped to the same edge as where CPE is mapped. But when traffic source is mapped to different edge/gateway region as opposed to where the CPE is mapped to, it becomes more difficult. Also download traffic can be mapped to combination of set of gateway regions and the edge region as well (direct from origin).

The following provides details regarding enforcement for a remote-connected Customer Premises Equipment (CPE).

Goal here is to use CPE's capacity limit and GQM allocated capacity to enforce traffic at gateway regions for remote connected CPEs. This would conserve network bandwidth and help to reduce COGS to a considerable extent. This would also give early feedback to the source about the bottleneck, thereby resulting in better throughput. Extent of improvements needs to be studied based on different configuration, deployment and load characteristics.

Remote enforcement for download traffic to a CPE is configurable and can be turned on/off at various levels (SP or customer or CPE). For certain traffic flows, both source and destination can be known CPEs and can have their own capacity limits. In such cases, this design limits to using only source CPE limit to enforce traffic. Below are proposed approaches for enforcing download traffic destined to remote connected CPE/endpoints. The enforcement mechanism for download traffic to a CPE is configurable for one of the below approach, default is set to non-centralized.
Enforcement based on configured capacity thresholds (non-centralized):

QoS Engine on gateway regions applies rate limiting based on configured capacity of destination CPE If there are multiple origins or branches sending traffic to a remote CPE, then enforcement is done from all such regions where the traffic sources are connected. The net effect is that download traffic rate to the remote CPE through preferably mid-gress never exceeds a multiple of the configured capacity. The multiple is dependent on how many gateway regions are involved in download traffic to a particular CPE. The egress traffic from edge region to CPE can still be enforced to configured capacity, thus limiting usage on that network segment to purchased capacity.

There is no GQM involvement for enforcement

Enforcement based on capacity allocation from GQM (centralized):

QoS Engine on gateway regions applies rate limiting based on configured capacity of destination CPE Traffic load information is sent to RQM RQM sends traffic load report from the region to GQM GQM aggregates traffic load for CPE from set of regions GQM performs allocation of CPE capacity to each of the regions which have reported load for the corresponding CPE.

Once allocation is done, GQM sends capacity update to RQMs. For regions which have not reported load for a CPE, GQM might decide to send fair share capacity RQM receives capacity allocation from GQM and uses that value to calculate per machine capacity share for each endpoint based on direction Region machines use the capacity value provided by RQM to rate-limit traffic being sent to remote connected CPE QoS Packet Processing On traffic reception, a series of functions are performed to enforce capacity for a customer. The packets are fed into QoS engine for policy checks. QoS APIs are invoked for en-queuing packets to QoS Engine and de-queueing packets from QoS Engine. Flow and packet context references are provided as API parameters.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

Preferably, the point of entry into the overlay network is through a VPN tunnel between a client machine and a NEdge.

The techniques herein generally provide for the above-described improvements to a technology or technical field, as well as the specific technological improvements to various fields including distributed networking, Internet-based overlays, WAN-based networking (using MPLS or otherwise), secure utilization of Internet links, and the like, all as described above.

Having described our invention, what we claim is set forth below:

1. A method of managing and enforcing quality-of-service (QoS), comprising:
   providing, as a service, and using an Internet content delivery network (CDN) infrastructure, an Internet-based overlay routing network, wherein the overlay routing network comprises an edge region comprising a set of CDN server machines, wherein at least one of the CDN server machines operates a quality-of-service (QoS) engine;
   coupling a customer branch to the edge region of the Internet-based overlay routing network, the customer branch associated with a customer of the service;
   configuring a quality-of-service (QoS) policy for the customer;
   monitoring utilization of the Internet-based overlay network against the configured QoS policy; and
   executing a packet scheduler algorithm in the QoS engine, the packet scheduler algorithm enforcing sharing of traffic for the customer and at least one other customer within the edge region according to the QoS policy.

2. The method as described in claim 1 wherein capacity is enforced for the customer according to the policy at one of: a global level, a geographical region level, and at the customer branch level.

3. The method as described in claim 1 enforcing QoS for the customer and the at least one other customer includes:
   enforcing traffic based on a current capacity;
   while enforcing, learning demand;
   propagating demand so learned as a global demand;
   calculating a new capacity based on the global demand;
   propagating the new capacity; and
   using the new capacity for further enforcement.

4. The method as described in claim 3, wherein the steps are repeated at a given time interval.

\* \* \* \* \*